(12) United States Patent
Zhu

(10) Patent No.: US 9,641,636 B2
(45) Date of Patent: May 2, 2017

(54) INFORMATION PUSHING METHOD AND APPARATUS

(71) Applicant: Tencent Technology (Shenzhen) Company Limited, Shenzhen (CN)

(72) Inventor: Jingtao Zhu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/190,023

(22) Filed: Jun. 22, 2016

(65) Prior Publication Data

US 2016/0330039 A1    Nov. 10, 2016

Related U.S. Application Data

(63) Continuation of application No. PCT/CN2015/082193, filed on Jun. 24, 2015.

(30) Foreign Application Priority Data

Jun. 25, 2014 (CN) .......................... 2014 1 0293240

(51) Int. Cl.
  *H04L 29/08* (2006.01)
  *H04L 12/18* (2006.01)
(52) U.S. Cl.
  CPC .......... *H04L 67/26* (2013.01); *H04L 12/1859* (2013.01)
(58) Field of Classification Search
  CPC ............................ H04L 67/26; H04L 12/1859
  See application file for complete search history.

(56) References Cited

U.S. PATENT DOCUMENTS

| 9,210,117 | B2* | 12/2015 | Chen | ................. H04L 67/16 |
| 2008/0201285 | A1* | 8/2008 | Dai | ............... G06F 17/30867 |
| | | | | 706/45 |
| 2008/0281936 | A1* | 11/2008 | Li | ..................... G06Q 10/107 |
| | | | | 709/207 |
| 2010/0075701 | A1* | 3/2010 | Shang | ................ G06Q 30/02 |
| | | | | 455/466 |

FOREIGN PATENT DOCUMENTS

| CN | 1987916 A | 6/2007 |
| CN | 101075253 A | 11/2007 |
| CN | 102073956 A | 5/2011 |
| CN | 103067758 A | 4/2013 |
| TW | 201305937 A | 2/2013 |
| TW | 201316275 A | 4/2013 |

OTHER PUBLICATIONS

Tencent Technology, ISRWO, PCT/CN2015/082193, Sep. 22, 2015, 7 pgs.
Tencent Technology, IPRP, PCT/CN2015/082193, Dec. 27, 2016, 5 pgs.

* cited by examiner

*Primary Examiner* — Michael C Lai
(74) *Attorney, Agent, or Firm* — Morgan, Lewis & Bockius LLP

(57) ABSTRACT

An information pushing method includes: acquiring target information for issuing a target event; acquiring user characteristics of a plurality of user accounts and selecting a target user account of which a user characteristic meets a preset characteristic from the plurality of user accounts, where the preset characteristic includes a user characteristic of a user account that is expected to participate in the target event; and pushing the target information to the target user account.

12 Claims, 4 Drawing Sheets

INFORMATION PUSHING METHOD AND APPARATUS

RELATED APPLICATIONS

This application is a continuation application of PCT Patent Application No. PCT/CN2015/082193, entitled "INFORMATION PUSHING METHOD AND APPARATUS" filed on Jun. 24, 2015, which claims priority to Chinese Patent Application No. 201410293240.5, "INFORMATION PUSHING METHOD AND APPARATUS," filed on Jun. 25, 2014, both of which are hereby incorporated by reference in their entirety.

FIELD OF THE TECHNOLOGY

The present disclosure relates to the field of Internet technologies, and in particular, to an information pushing method and apparatus.

BACKGROUND OF THE DISCLOSURE

In Internet technologies, a network side device usually needs to push information to a user side device, for example, pushing a system broadcast, security prompt information, email check information, and activity prompt information. However, the current information pushing to a user side by a network side is long-term, repeated pushing based on a fixed user group, that is, information pushing is performed on the user group repeatedly in a long term. However, information pushed repeatedly in a long term is not always effective for all users in a fixed user group. For example, if a certain user in the fixed user group has not been on line for a long time, or if another user in the fixed user group has a security vulnerability, information pushed in such the method is not effective for the two users. In view of the above, the effective rate of information pushing in the foregoing technology is not high.

SUMMARY

In a first aspect, embodiments of the present invention provide an information pushing method, including:
  acquiring target information for issuing a target event;
  acquiring user characteristics of a plurality of user accounts and selecting a target user account of which a user characteristic meets a preset characteristic from the plurality of user accounts, the preset characteristic including a user characteristic of a user account that is expected to participate in the target event; and
  pushing the target information to the target user account.

In a second aspect, the embodiments of the present invention provide an information pushing apparatus, including: an acquiring unit, a selecting unit, and a pushing unit,
  the acquiring unit being configured to acquire target information for issuing a target event;
  the selecting unit being configured to acquire user characteristics of a plurality of user accounts and select a target user account of which a user characteristic meets a preset characteristic from the plurality of user accounts, the preset characteristic including a user characteristic of a user account that is expected to participate in the target event; and
  the pushing unit being configured to push the target information to the target user account.

In the foregoing technical solutions, target information for issuing a target event is acquired, user characteristics of a plurality of user accounts are then acquired and a target user account of which a user characteristic meets a preset characteristic is selected from the plurality of user accounts, where the preset characteristic includes a user characteristic of a user account that is expected to participate in the target event, and the target information is finally pushed to the target user account. Because the target user account in the embodiments of the present invention is screened out by using the user characteristic, in this manner, the embodiments of the present invention may improve the effective rate of information pushing as compared with the long-term, repeated pushing based on a fixed user group of the existing technology.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

In the embodiments of the present invention, a target event may be any event in which a network side device and a user side device participate. For example: the target events may include: an account registration event, an account login event, an information sharing event, a payment event, a fee paying event, an order generating event, a downloading event, and a recharge event. In addition, the target events may further include an execution event and a preferential event. The execution event may be an account registration event, an account login event, an information sharing event, a payment event, a fee paying event, an order generating event, a downloading event, and a recharge event. The preferential may refer to a preferential event or preferential privilege that may be obtained after a user account participates in an execution event. In addition, target information for issuing a target event may be used for describing or illustrating information of the target event, or may be used for describing or illustrating an execution event and information that a preferential event can be obtained by participating in an execution event. For example: the target information may be used for describing an account login event and information that a preferential privilege can be obtained after an account is logged in. In addition, the target information may further be used for describing participating time, a participating rule, and a maximum number of participating user accounts of the target event. In addition, an event in which a network side device (for example: a server) and a user side device (a user terminal) participate may also be understood as that the user side device participates in an activity issued by the network side device and the activity is the target event, because for a user to participate in a certain event by using a user account may be understood as that the user participates in a certain activity.

In addition, the user accounts in the embodiments of the present invention include, but are not limited to: a communication account, an email account, a social network site (SNS) account, a game account, a bank account, a fund account, a shopping website account, a broadband account, and a household appliance account.

Figure 1:
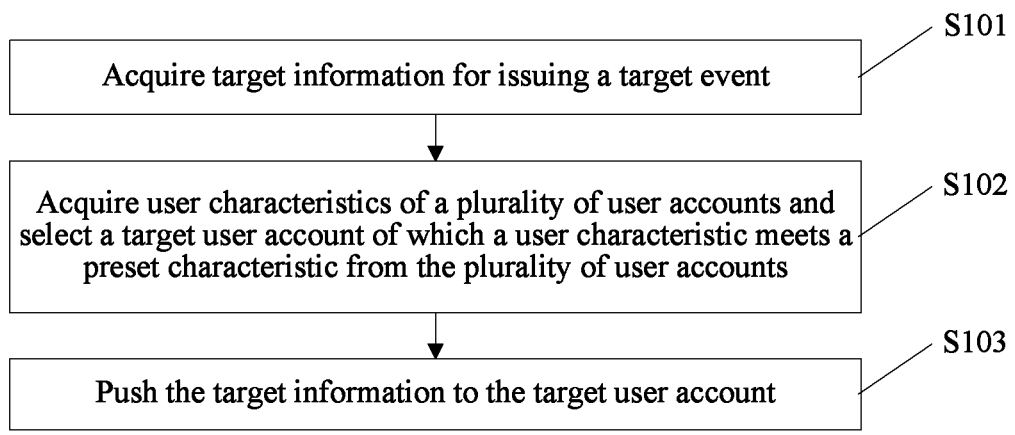
FIG. 1 is a schematic flowchart of an information pushing method provided by an embodiment of the present invention.

With reference to FIG. 1, FIG. 1 is a schematic flowchart of an information pushing method provided by an embodiment of the present invention. As shown in FIG. 1, the method includes the following steps:

S101: Acquire target information for issuing a target event.

The target information acquired in step S101 may be generated, or may be received from a device that provides the target event.

S102: Acquire user characteristics of a plurality of user accounts and select a target user account of which a user characteristic meets a preset characteristic from the plurality of user accounts, where the preset characteristic includes a user characteristic of a user account that is expected to participate in the target event.

Optionally, the user characteristic may include at least one of the following:

a user account basic attribute, a user account activity level, a user account login time, a user account login rule, a user account grade, and a user account balance.

Optionally, the user characteristic of the user account that is expected to participate in the target event may be a user characteristic of a user account that is expected to participate in the target event by the device that provides the target event. In this manner, by step S102, it can be obtained that the target user accounts include a user account that is expected to participate in the target event. For example, if the user account that is expected to participate in the target event is a user account with a grade of VIP, the preset characteristic may include a user characteristic with the grade VIP, that is, the target user account includes the user characteristic with the grade of VIP. Or, if the user account that is expected to participate in the target event is a user account with an activity level greater than a specific threshold, the preset characteristic may include a user characteristic with the activity level greater than the specific threshold, that is, the target user account includes the user characteristic with the activity level greater than the specific threshold. In addition, the user account that is expected to participate in the target event may further be a user account having a high possibility of participating in the target event that is counted by the device that provides the target event.

The plurality of user accounts may be a plurality of user accounts in a specific group, for example, may be a plurality of user accounts located in a certain area, or may be a plurality of user accounts having a close registration time. In addition, the plurality of user accounts may be a plurality of user devices selected by the device that provides the target event.

It should be noted that the device that provides the target event may be a network side server. For example: if the target event includes an account registration event, the server may be a server that provides account registration. In addition, the device that provides the target event may be a device that executes the present method, or may also be a device that does not execute the present method.

S103: Push the target information to the target user account.

After receiving the target information, a user terminal that logs in the target user account may show the target information, or may show profile information of the target information, so as to enable a user that uses the target user account to learn about the target event. When the user needs to participate in the target event, the user may participate in the target event by using the target user account.

By the foregoing steps, pushing of target information only to target user accounts that meet user characteristics of user accounts that are expected to participate in the target event may be implemented, or it may be understood as that user accounts to which target information is pushed are all user accounts that are expected to participate in the target event. In this manner, the effective rate of target information transmission will be quite high.

Optionally, the foregoing method may be used in a server.

In the foregoing technical solutions, target information for issuing a target event is acquired, user characteristics of a plurality of user accounts are then acquired and a target user account of which a user characteristic meets a preset characteristic is selected from the plurality of user accounts, where the preset characteristic includes a user characteristic of a user account that is expected to participate in the target event, and the target information is finally pushed to the target user account. Because the target user account in the embodiments of the present invention is screened out by using the user characteristic, in this manner, the embodiments of the present invention may improve the effective rate of information pushing as compared with the long-term, repeated pushing based on a fixed user group of the existing technology.

Figure 2:
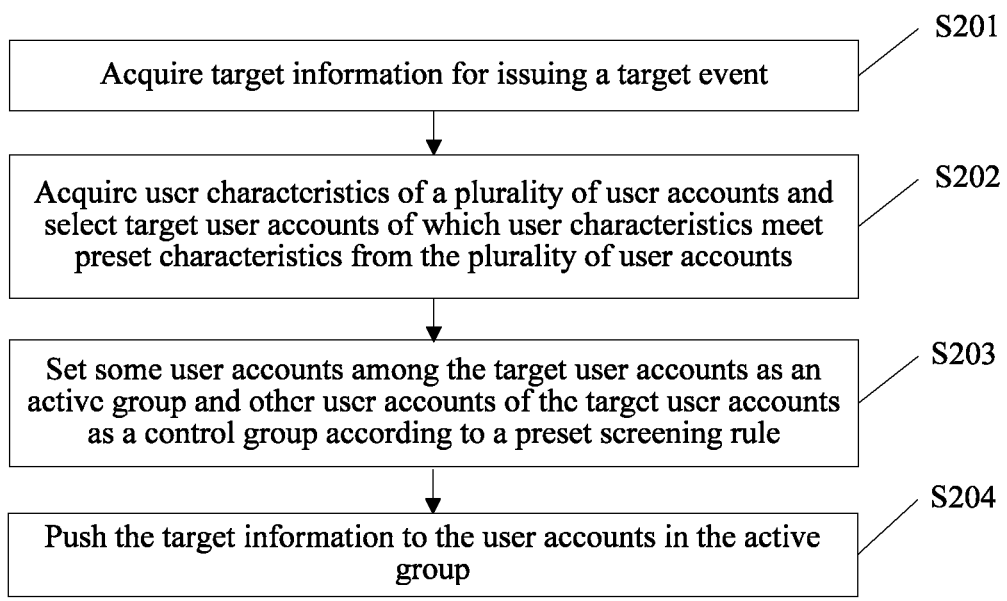
FIG. 2 is a schematic flowchart of another information pushing method provided by an embodiment of the present invention.

With reference to FIG. 2, FIG. 2 is a schematic flowchart of another information pushing method provided by an embodiment of the present invention. As shown in FIG. 2, the method includes the following steps:

S201: Acquire target information for issuing a target event.

S202: Acquire user characteristics of a plurality of user accounts and select target user accounts of which user characteristics meet preset characteristics from the plurality of user accounts, where the preset characteristics include user characteristics of user accounts that are expected to participate in the target event and the target user accounts include a plurality of user accounts.

In step S202, the target user accounts may be selected periodically. For example: the selection is performed once each day, because the user characteristics of the user accounts may be different in different periods. Such the periodic selection of target user accounts may enable the selected target user accounts to be more accurate, so as to improve the effective rate of the target information. In addition, when the target user accounts selected in step S202 change, subsequent steps may also be executed again. In addition, each time after the target user accounts are reselected in step S202, the number of target user accounts that are currently selected may further be compared with the number of target user accounts that are selected in a previous time, or recording is performed for subsequent statistics or analysis.

S203: Set some user accounts among the target user accounts as an active group and other user accounts of the target user accounts as a control group according to a preset screening rule.

In step S203, an active group and a control group may be screened out from the target user accounts according to a specific proportion, or an active group and a control group may be screened out from the target user accounts according to a specific screening rule.

S204: Push the target information to the user accounts in the active group.

Figure 3:
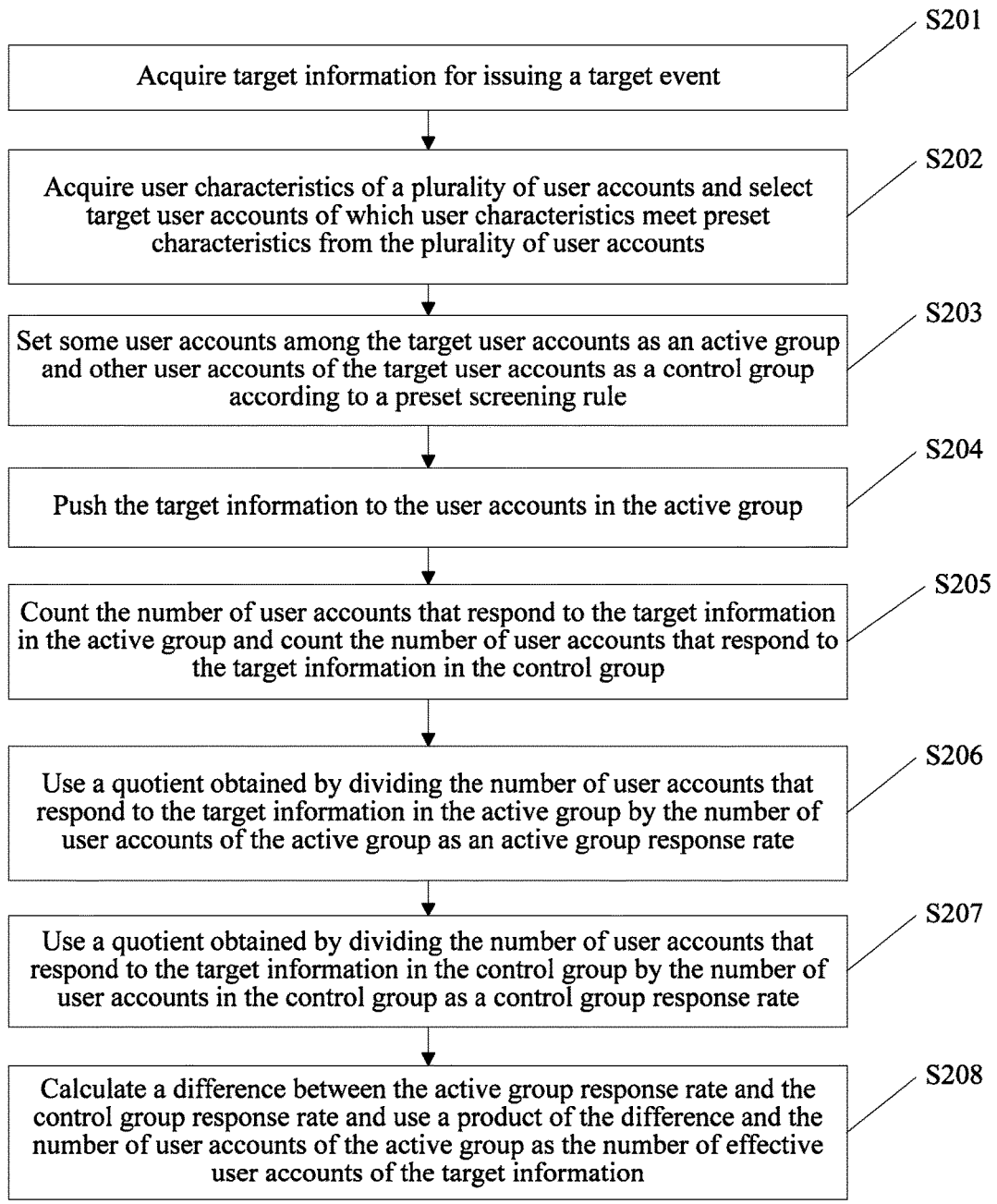
FIG. 3 is a schematic flowchart of another information pushing method provided by an embodiment of the present invention.

By step S204, pushing of the target information only to the active group and not to the control group may be implemented. In this manner, pushing of the target information to users of some target accounts may be implemented, because participate in a target event of some user accounts is not necessarily performed after the target information is acquired in actual applications. For example: some user accounts actively participate in the target event. In addition, the number of the effective target users may further be calculated by using the user accounts in the active group and the control group. For example: as shown in FIG. 3, the method may further include the following steps:

S205: Count the number of user accounts that respond to the target information in the active group and count the number of user accounts that respond to the target information in the control group.

S206: Use a quotient obtained by dividing the number of user accounts that respond to the target information in the active group by the number of user accounts of the active group as an active group response rate.

S207: Use a quotient obtained by dividing the number of user accounts that respond to the target information in the control group by the number of user accounts in the control group as a control group response rate.

S208: Calculate a difference between the active group response rate and the control group response rate and use a product of the difference and the number of user accounts of the active group as the number of effective user accounts of the target information.

Optionally, the user accounts that respond to the target information may include at least one of the following:

a user account that participates in the target event, a user account that shows the target information, and a user account that shares the target information.

The user account that shows the target information may indicate that an operation of a tap on the target information occurs in a user terminal that the user account is logged in. For example: in step S204, only profile information of the target information is pushed to a user account in the active group, and when a user that uses the user account wants to check the target information, the user may tap the profile information of the target information, so that complete target information is pushed to the user account in step S204. The user account that shares the target information may include a user account that converts or copies the target information.

Optionally, in step S208, the number of effective user accounts of the target information is calculated by using the following formula:

number of effective user accounts=(active group response rate−control group response rate) *number of user accounts in the active group.

In addition, the understanding of the response rate varies with respect to different target events. For example: with respect to an account login event (or may also be understood as a reflux event, that is, the user account is logged in again), the response rate may be equal to a quotient obtained by dividing the number of logged-in user accounts in the group by the number of user accounts in the group. With respect to a payment event, the response rate may be equal to a quotient obtained by dividing the number of payment user accounts in the group by the number of user accounts in the group. With respect to a registration event, the response rate may be equal to a quotient obtained by dividing the number of newly-registered user accounts in the group by the number of user accounts in the group.

Optionally, step S203 may include:

using user accounts whose target identifications meet specific conditions among the target user accounts as the active group and assigning user accounts whose target identifications do not meet the characteristic conditions among the target user accounts as the control group comprises, where a plurality of identifications are allocated to each user account.

A plurality of identifications may be allocated to all user accounts in a large-scale set. For example: a plurality of identifications is randomly allocated to a user account, and in this manner, content of identifications of different user accounts may be random. The foregoing large-scale set may be understood as a system, for example, a communication system and a game system. That is, all the user accounts in the large-scale set may be understood as all user accounts in a certain system. In addition, identifications may be allocated to a user account of a user when the user runs the large-scale set, that is, identifications are allocated when a user performs user account registration.

For example: identifications (for example: IDs) allocated to a user account A may be as follows:

| | ID | | | | | | | | | |
|---|---|---|---|---|---|---|---|---|---|---|
| | ID1 | ID2 | ID3 | ID4 | ID5 | ID6 | ID7 | ID8 | ID9 | ID10 |
| User account A | 0.12 | 0.22 | 0.59 | 0.98 | 0.32 | 0.12 | 0.01 | 0.03 | 0.78 | 0.85 |

For example, the target identification is the IDT and the specific condition is less than or equal to 0.05. Content of the IDT of the user account A is 0.01, and thus the user account A may be used as an active group. For example, the target identification is the IDT and the specific condition is greater than or equal to 0.05. Content of the IDT of the user account A is 0.01, and thus the user account A may be used as a control group.

In the implementation, the active group and the control group may be selected according to identifications and identification content of the user account. In this manner, screening of the active group and the control group may be implemented more flexibly. When there is a plurality of pieces of target information and each piece of target information is corresponding to a different identification and a different specific condition, different active groups and different control groups may be screened out for different pieces of target information, so as to ensure that the different pieces of target information do not interfere with each other and further the different pieces of target information are pushed to the same user account. For example: step S201 may include:

acquiring a plurality of pieces of target information, where each piece of target information is used for issuing at least one target event.

Step S203 may include:

allocating identification information and a specific condition to each piece of target information, where the identification information is corresponding to at least one identification of a user account; and selecting an active group and a control group of each piece of target information from the target user accounts, where an identification that is of a user account in the active group of the target information and is corresponding to the target information meets the specific condition of the target information, and an identification that is of a user account in the control group of the target information and is corresponding to the target information does not meet the specific condition of the target information.

In this manner, active groups and control groups are screened out for a plurality of different pieces of target information. For example, if identification information of target information 1 is corresponding to a first identification (ID1), the specific condition of the target information 1 is that the identification content is less than or equal to 0.2; if the identification information of the target information 1 is corresponding to a second identification (ID2), the specific condition of the target information 1 is that the identification content is less than or equal to 0.3. The target user accounts include at least the user account A and a user account B.

Identifications (for example: IDs) allocated to the user account A may be as follows:

| | ID | | | | | | | | | |
|---|---|---|---|---|---|---|---|---|---|---|
| | ID1 | ID2 | ID3 | ID4 | ID5 | ID6 | ID7 | ID8 | ID9 | ID10 |
| User account A | 0.12 | 0.22 | 0.59 | 0.98 | 0.32 | 0.12 | 0.01 | 0.03 | 0.78 | 0.85 |

Identifications (for example: IDs) allocated to the user account B may be as follows:

| | ID | | | | | | | | | |
|---|---|---|---|---|---|---|---|---|---|---|
| | ID1 | ID2 | ID3 | ID4 | ID5 | ID6 | ID7 | ID8 | ID9 | ID10 |
| User account B | 0.23 | 0.18 | 0.25 | 0.75 | 0.38 | 0.18 | 0.05 | 0.05 | 0.70 | 0.15 |

In this manner, it can be obtained that the ID1 of the user account A meets the specific condition of the target information 1, and therefore, the user account A is a user account in the active group of the target information 1; and the ID 1 of the user account B does not meet the specific condition of the target information 1, and therefore the user account B is a user account in the control group of the target information 1. Moreover, the ID2 of the user account A meets a specific condition of target information 2, and therefore, the user account A is a user account in the active group of the target information 2; and the ID2 of the user account B also meets the specific condition of the target information 2, and therefore the user account B is also a user account in the control group of the target information 2. In this manner, active groups and control groups of different pieces of target information may be obtained and different active groups and different control groups are screened out for different pieces of target information, so as to ensure that the different pieces of target information do not interfere with each other and further the different pieces of target information may be pushed to the same user account.

In addition, by performing tails on the technical solution of the present implementation, a result is obtained as follows:

by pushing 40 pieces of target information, services corresponding to target events issued by the target information bring about 19 million active user accounts, 2.6 million effective user accounts, and 10 million revenues each month.

Optionally, step S204 may include:

sending the target information of the active group to a plurality of user accounts of the active group and pushing, if there is a user account that pertains to active groups of a plurality of pieces of target information, the plurality of pieces of target information to the user account in turn.

In this manner, different pieces of target information are sent to different active groups, so as to push the different pieces of target information to the different active groups. In this manner, different groups may obtain different pieces of target information, so as to learn about different target events to facilitate participate in the target events. In addition, when there is a user account that pertains to a plurality of active groups, a plurality of pieces of target information may be pushed to the user account in turn. In this manner, the plurality of pieces of target information may be displayed at the same interface position of a user terminal where the user account is, so as to save display space of the user terminal.

Optionally, the method may further include the following step:

detecting user behaviors of the target user accounts and removing, if it is found, according to the user behaviors, there is a user account that has responded to the target information, the user account from the active group.

In this manner, pushing of target information to a user account that has responded to the target information may be avoided, and because pushing of target information to a user account that has responded to the target information is not effective, the effective rate of the target information is improved and network resources are saved. In addition, by the foregoing detection, the user behaviors of the target user accounts may be detected in real time or periodically. The user behaviors may include, for example, events that the user account participates in or operations that are performed by the user account.

Optionally, the foregoing method may be used in a server.

Optionally, in some application scenarios, the target information may be understood as marketing activities. Content of the marketing activities may be the target event. For example, for a user drain prevention marketing activity of a certain game, the content of the marketing activity may be a game account login event and a preferential activity after login. For another example, for a payment soliciting activity, the content of the marketing activity may be a payment event and a preferential activity after payment.

In the foregoing technical solution, a plurality of optional embodiments is added on the basis of the first embodiment, and all the embodiments can improve the effective rate of the target information.

Apparatus embodiments of the present invention are provided below. The apparatus embodiments of the present invention are configured to execute the methods of the first and second method embodiments of the present invention. To make it convenient to describe, only the part that is relevant to the embodiments of the present invention is shown and specific details are not described. Reference may be made to the Embodiment 1 and Embodiment 2 of the present invention.

Figure 4:
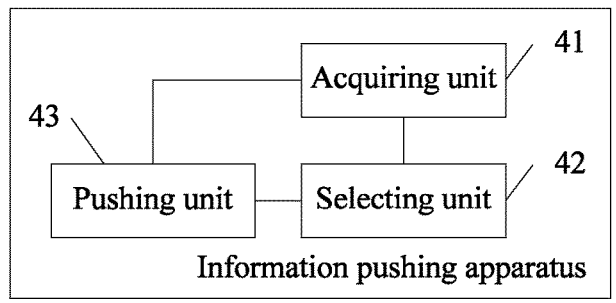
FIG. 4 is a schematic structural diagram of an information pushing apparatus provided by an embodiment of the present invention.

With reference to FIG. 4, FIG. 4 is a schematic structural diagram of an information pushing apparatus provided by an embodiment of the present invention. As shown in FIG. 4, the apparatus includes: an acquiring unit 41, a selecting unit 42, and a pushing unit 43.

The acquiring unit 41 is configured to acquire target information for issuing a target event.

The target information acquired by the acquiring unit 41 may be generated, or may be received from a device that provides the target event.

The selecting unit 42 is configured to acquire user characteristics of a plurality of user accounts and select a target user account of which a user characteristic meets a preset characteristic, where the preset characteristic includes a user characteristic of a user account that is expected to participate in the target event.

Optionally, the user characteristic may include at least one of the following:

a user account basic attribute, a user account activity level, a user account login time, a user account login rule, a user account grade, and a user account balance.

Optionally, the user characteristic of the user account that is expected to participate in the target event may be a user characteristic of a user account that is expected to participate in the target event by the device that provides the target event. In this manner, by using the selecting unit 42, it can be obtained that the target user account includes a user account that is expected to participate in the target event. For example, if the user account that is expected to participate in the target event is a user account with a grade of VIP, the preset characteristic may include a user characteristic with the grade VIP, that is, the target user account includes the user characteristic with the grade of VIP. Or, if the user account that is expected to participate in the target event is a user account with an activity level greater than a specific threshold, the preset characteristic may include a user characteristic with the activity level greater than the specific threshold, that is, the target user account includes the user characteristic with the activity level greater than the specific threshold. In addition, the user account that is expected to participate in the target event may further be a user account having a high possibility of participating in the target event that is counted by a device that provides the target event.

The plurality of user accounts may be a plurality of user accounts in a specific group, for example, may be a plurality of user accounts located in a certain area, or may be a plurality of user accounts having a close registration time. In addition, the plurality of user accounts may be a plurality of user devices selected by the device that provides the target event.

It should be noted that the device that provides the target event may be a network side server. For example: if the target event includes an account registration event, the server is a server that provides account registration. In addition, the device that provides the target event may be a device that includes the present apparatus, or may also be a device that does not include the present apparatus.

The pushing unit 43 is configured to push the target information to the target user account.

After receiving the target information, a user terminal that logs in the target user account may show the target information, or may show profile information of the target information, so as to enable a user that uses the target user account to learn about the target event. When the user needs to participate in the target event, the user may participate in the target event by using the target user account.

By the foregoing units, pushing of target information only to a target user account that meets a user characteristic of a user account that is expected to participate in the target event may be implemented, or it may be understood as that user accounts to which target information is pushed are all user accounts that are expected to participate in the target event. In this manner, the effective rate of target information transmission will be quite high.

Optionally, the apparatus may be used in a server, that is, the server may include the apparatus.

In the foregoing technical solutions, target information for issuing a target event is acquired, user characteristics of a plurality of user accounts are then acquired and a target user account of which a user characteristic meets a preset characteristic is selected from the plurality of user accounts, where the preset characteristic includes a user characteristic of a user account that is expected to participate in the target event, and the target information is finally pushed to the target user account. Because the target user account in the embodiments of the present invention is screened out by using the user characteristic, in this manner, the embodiments of the present invention may improve the effective rate of information pushing as compared with the long-term, repeated pushing based on a fixed user group of the existing technology.

Figure 5:
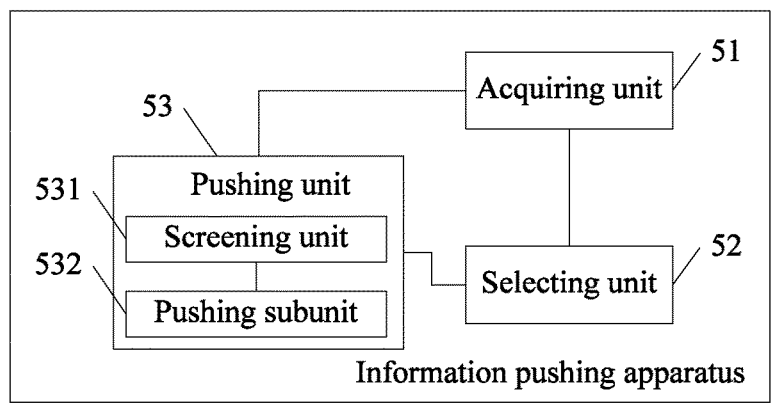
FIG. 5 is a schematic structural diagram of another information pushing apparatus provided by an embodiment of the present invention.

With reference to FIG. 5, FIG. 5 is a schematic structural diagram of another information pushing apparatus provided by an embodiment of the present invention. As shown in FIG. 5, the apparatus includes: an acquiring unit 51, a selecting unit 52, and a pushing unit 53. The pushing unit 53 includes a screening unit 531 and a pushing subunit 532.

The acquiring unit 51 is configured to acquire target information for issuing a target event.

The selecting unit 52 is configured to acquire user characteristics of a plurality of user accounts and select target user accounts of which user characteristics meet preset characteristics from the plurality of user accounts, where the preset characteristics include user characteristics of user accounts that are expected to participate in the target event and the target user accounts include a plurality of user accounts.

In the selecting unit 52, the target user accounts may be selected periodically. For example: the selection is performed once each day, because the user characteristics of the user accounts may be different in different periods. Such the periodic selection of target user accounts may enable the selected target user accounts to be more accurate, so as to improve the effective rate of the target information. In addition, when the target user accounts selected by the selecting unit 52 change, subsequent executions by the other units may also be performed again. In addition, each time after the selecting unit 52 reselects target user accounts, it may further compare the number of target user accounts that are currently selected with the number of target user accounts that are selected in a previous time, or may perform recording for subsequent statistics or analysis.

The screening unit 531 is configured to set some user accounts among the target user accounts as an active group and other user accounts of the target user accounts as a control group according to a preset screening rule.

The screening unit 531 may screen out an active group and a control group from the target user accounts according to a specific proportion, or screen out an active group and a control group from the target user accounts according to a specific screening rule.

The pushing subunit 532 is configured to push the target information to the user accounts in the active group.

Figure 6:
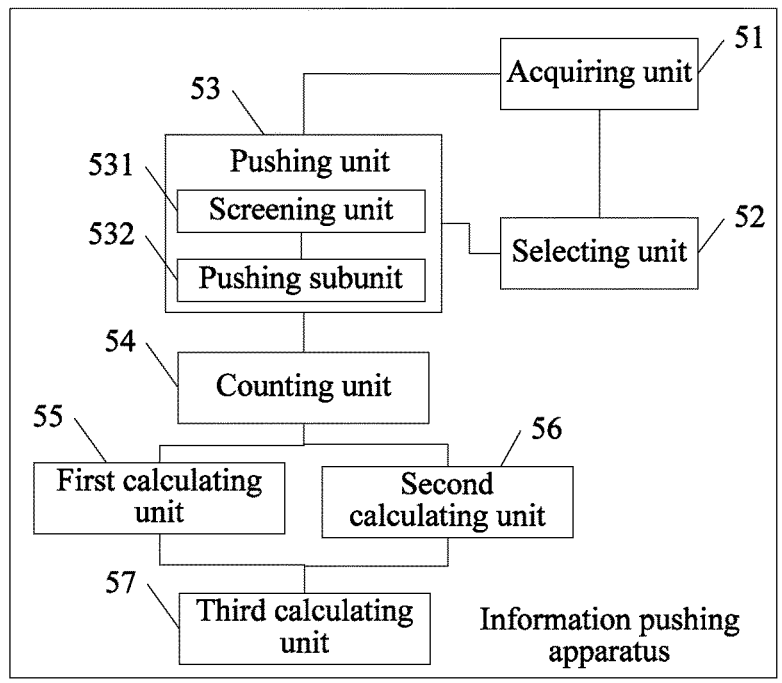
FIG. 6 is a schematic structural diagram of another information pushing apparatus provided by an embodiment of the present invention.

By using the pushing subunit 532, pushing of the target information only to the active group and not to the control group may be implemented. In this manner, pushing of the target information to users of some target accounts may be implemented, because participate in a target event of some user accounts is not necessarily performed after the target information is acquired in actual applications. For example: some user accounts actively participate in the target event. In addition, the number of the effective target users may further be calculated by using the user accounts in the active group and the control group. For example: as shown in FIG. 6, the apparatus may further include:

a counting unit 54, configured to count the number of user accounts that respond to the target information in the active group and count the number of user accounts that respond to the target information in the control group;

a first calculating unit 55, configured to use a quotient obtained by dividing the number of user accounts that respond to the target information in the active group by the number of user accounts of the active group as an active group response rate;

a second calculating unit 56, configured to use a quotient obtained by dividing the number of user accounts that respond to the target information in the control group by the number of user accounts in the control group as a control group response rate; and a third calculating unit 57, configured to calculate a difference between the active group response rate and the control group response rate and use a product of the difference and the number of user accounts of the active group as the number of effective user accounts of the target information.

Optionally, the user accounts that respond to the target information may include at least one of the following:

a user account that participates in the target event, a user account that shows the target information, and a user account that shares the target information.

The user account that shows the target information may indicate that an operation of a tap on the target information occurs in a user terminal that the user account is logged in. For example: in the pushing subunit 532, only profile information of the target information is pushed to a user account in the active group, and when a user that uses the user account wants to check the target information, the user may tap the profile information of the target information, so that the pushing subunit 532 further pushes the complete target information to the user account. The user account that shares the target information may include a user account that converts or copies the target information.

Optionally, the third calculating unit 57 calculates the number of effective user accounts of the target information by using the following formula:

number of effective user accounts=(active group response rate−control group response rate)*number of user accounts in the active group In addition, the understanding of the response rate varies with respect to different target events. For example: with respect to an account login event (or may also be understood as a reflux event, that is, the user account is logged in again), the response rate may be equal to a quotient obtained by dividing the number of logged-in user accounts in the group by the number of user accounts in the group. With respect to a payment event, the response rate may be equal to a quotient obtained by dividing the number of payment user accounts in the group by the number of user accounts in the group. With respect to a registration event, the response rate may be equal to a quotient obtained by dividing the number of newly-registered user accounts in the group by the number of user accounts in the group.

Optionally, the screening unit 531 may also configured to use user accounts whose target identifications meet specific conditions among the target user accounts as the active group and use user accounts of which content of target identifications does not meet the characteristic conditions among the target user accounts as a control group. A plurality of identifications is allocated to each user account.

A plurality of identifications may be allocated to all user accounts in a large-scale set. For example: a plurality of identifications is randomly allocated to a user account, and in this manner, content of identifications of different user accounts may be random. The foregoing large-scale set may be understood as a system, for example, a communication system and a game system. That is, all the user accounts in the large-scale set may be understood as all user accounts in a certain system. In addition, identifications may be allocated to a user account of a user when the user runs the large-scale set, that is, identifications are allocated when a user performs user account registration.

For example: identifications (for example: IDs) allocated to a user account A may be as follows:

| | ID | | | | | | | | | |
|---|---|---|---|---|---|---|---|---|---|---|
| | ID1 | ID2 | ID3 | ID4 | ID5 | ID6 | ID7 | ID8 | ID9 | ID10 |
| User account A | 0.12 | 0.22 | 0.59 | 0.98 | 0.32 | 0.12 | 0.01 | 0.03 | 0.78 | 0.85 |

For example, the target identification is the IDT and the specific condition is less than or equal to 0.05. Content of the IDT of the user account A is 0.01, and thus the user account A may be used as an active group. For example, the target identification is the IDT and the specific condition is greater than or equal to 0.05. Content of the IDT of the user account A is 0.01, and thus the user account A may be used as a control group.

In the implementation, the active group and the control group may be selected according to identifications and identification content of the user account. In this manner, screening of the active group and the control group may be implemented more flexibly. When there is a plurality of pieces of target information and each piece of target information is corresponding to a different identification and a different specific condition, different active groups and different control groups may be screened out for different pieces of target information, so as to ensure that the different pieces of target information do not interfere with each other and further different pieces of target information are pushed to the same user account. For example: the acquiring unit 51 may be configured to acquire a plurality of pieces of target information. Each piece of target information is used to issue at least one target event.

Figure 7:
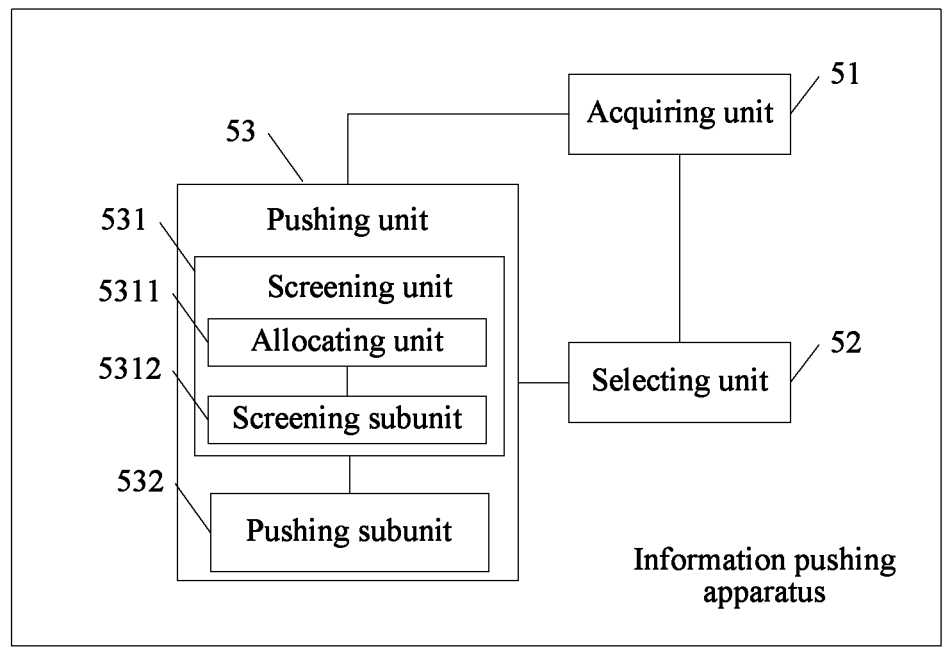
FIG. 7 is a schematic structural diagram of another information pushing apparatus provided by an embodiment of the present invention.

As shown in FIG. 7, the screening unit 531 may include:
an allocating unit 5311, configured to allocate identification information and a specific condition to each piece of target information, where the identification information is corresponding to at least one identification of a user account; and
a screening subunit 5312, configured to select an active group and a control group of each piece of target information from the target user accounts, where an identification that is of a user account in the active group of the target information and is corresponding to the target information meets the specific condition of the target information, and an identification that is of a user account in the control group of the target information and is corresponding to the target information does not meet the specific condition of the target information.

In this manner, active groups and control groups of different pieces of target information may be obtained and different active groups and different control groups are screened out for different pieces of target information, so as to ensure that the different pieces of target information do not interfere with each other and further the different pieces of target information may be pushed to the same user account.

Optionally, the pushing unit 532 may be configured to send the target information of the active group to a plurality of user accounts of the active group and push, if there is a user account that pertains to active groups of a plurality of pieces of target information, the plurality of pieces of target information to the user account in turn.

In this manner, different pieces of target information are sent to different active groups, so as to push the different pieces of target information to the different active groups. In this manner, different groups may obtain different pieces of target information, so as to learn about different target events to facilitate participate in the target events. In addition, when there is a user account that pertains to a plurality of active groups, a plurality of pieces of target information may be pushed to the user account in turn. In this manner, the plurality of pieces of target information may be displayed at the same interface position of a user terminal where the user account is, so as to save display space of the user terminal.

Figure 8:
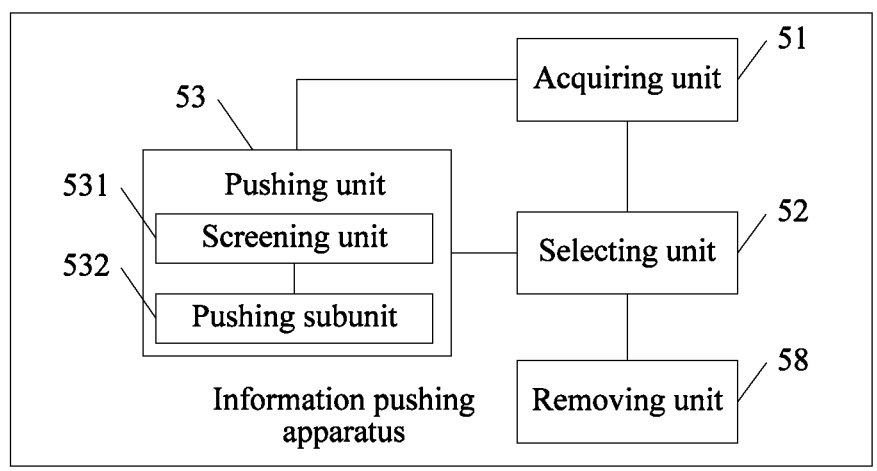
FIG. 8 is a schematic structural diagram of another information pushing apparatus provided by an embodiment of the present invention.

Optionally, as shown in FIG. 8, the apparatus may further include:
a removing unit 58, configured to detect user behaviors of the target user accounts and remove, if it is found, according to the user behaviors, there is a user account that has responded to the target information, the user account from the active group.

In this manner, pushing of target information to a user account that has responded to the target information may be avoided, and because pushing of target information to a user account that has responded to the target information is not effective, the effective rate of the target information is improved and network resources are saved. In addition, by the foregoing detection, the user behaviors of the target user accounts may be detected in real time or periodically. The user behaviors may include, for example, events that the user account participates in or operations that performed by the user account.

Optionally, the foregoing apparatus may be used in a server.

Optionally, in some application scenarios, the target information may be understood as marketing activities. Content of the marketing activities may be the target event. For example, for a user drain prevention marketing activity of a certain game, the content of the marketing activity may be a game account login event and a preferential activity after login. For another example, for a payment soliciting activity, the content of the marketing activity may be a payment event and a preferential activity after payment.

In the foregoing technical solution, a plurality of optional embodiments is added on the basis of the first apparatus embodiment, and all the embodiments can improve the effective rate of the target information.

A person of ordinary skill in the art may understand that all or some of the processes of the foregoing embodiment methods may be implemented by a program instructing relevant hardware. The program may be stored in a computer readable medium. The program may include the processes as the embodiments of the foregoing methods during execution. The storage medium may be, for example, a magnetic disk, an optical disk, a read-only memory (ROM), or a random access memory (RAM).

The foregoing disclosure is only preferred embodiments of the present invention, and certainly cannot be cited to limit the claims of the present disclosure. Therefore, equivalent changes based on the claims of the present disclosure still fall with the protection scope of the present disclosure.

What is claimed is:
1. An information pushing method, comprising:
at a server having one or more processors and memory storing programs to be executed by the one or more processors:

acquiring target information for issuing a target event and user characteristics of a plurality of user accounts as potential participants of the target event;

selecting, among the plurality of user accounts, target user accounts whose user characteristics meet preset characteristics, the preset characteristics including a user characteristic of a user account that is expected to participate in the target event;

splitting, according to a preset screening rule, the target user accounts into an active group of user accounts and a control group of user accounts, respectively, by target identifications that are randomly allocated to the target user accounts;

pushing the target information to the user accounts in the active group only without pushing the target information to the user accounts in the control group;

counting a number of user accounts in the active group that respond to the target event after receiving the target information and a number of user accounts in the control group that respond to the target event without receiving the target information during a predefined time window, wherein the target event has been issued to the active group and the control group;

determining an active group response rate by dividing the number of user accounts in the active group that respond to the target event after receiving the target information by a total number of user accounts in the active group;

determining a control group response rate by dividing the number of user accounts in the control group that respond to the target event without receiving the target information by the number of user accounts in the control group; and multiplying a difference between the active group response rate and the control group response rate by the total number of user accounts in the active group as a measure of effectiveness of the target information.

2. The method according to claim 1, wherein the user accounts that respond to the target event comprise at least one of the following:
a user account that participates in the target event, a user account that shows the target information, and a user account that shares the target information.

3. The method according to claim 1, wherein the step of splitting according to a preset screening rule, the target user accounts into an active group of user accounts and a control group of user accounts, respectively, by the target identifications that are randomly allocated to the target user accounts further comprises:
assigning user accounts whose-target identifications meet specific characteristic conditions among the target user accounts to the active group and assigning user accounts whose target identifications do not meet the characteristic conditions among the target user accounts as the control group, wherein a plurality of identifications is randomly allocated to each user account.

4. The method according to claim 3, wherein the step of acquiring target information for issuing a target event further comprises:
acquiring a plurality of pieces of target information, each piece of target information being used for issuing at least one target event; and
the step of assigning user accounts whose target identifications meet specific characteristic conditions among the target user accounts to the active group and assigning user accounts whose target identifications do not meet the characteristic conditions among the target user accounts to the control group comprises:
randomly allocating identification information and a specific condition to each piece of target information, the identification information being corresponding to at least one identification of a user account; and
selecting an active group and a control group of each piece of target information from the target user accounts, wherein an identification that is of a user account in the active group of the target information and is corresponding to the target information meets the specific characteristic condition of the target information, and an identification that is of a user account in the control group of the target information and is corresponding to the target information does not meet the specific condition of the target information.

5. The method according to claim 4, wherein the step of pushing the target information to the user accounts in the active group further comprises:
sending the target information of the active group to a plurality of user accounts in the active group and pushing, if there is a user account that pertains to active groups of a plurality of pieces of target information, the plurality of pieces of target information to the user account in turn.

6. The method according to claim 1, further comprising:
detecting user behaviors of the target user accounts; and
according to the user behaviors, removing a user account that has responded to the target event from the active group.

7. A server, comprising:
one or more processor;
memory; and
a plurality of program units stored on the memory and to be executed by the one or more processors, wherein the program units include a plurality of instruction for:
acquiring target information for issuing a target event and user characteristics of a plurality of user accounts as potential participants of the target event;

selecting, among the plurality of user accounts, target user accounts whose user characteristics meet preset characteristics, the preset characteristics including a user characteristic of a user account that is expected to participate in the target event;

splitting, according to a preset screening rule, the target user accounts into an active group of user accounts and a control group of user accounts, respectively, by target identifications that are randomly allocated to the target user accounts;

pushing the target information to the user accounts in the active group only without pushing the target information to the user accounts in the control group;

counting a number of user accounts in the active group that respond to the target event after receiving the target information and a number of user accounts in the control group that respond to the target event without receiving the target information during a predefined time window, wherein the target event has been issued to the active group and the control group;

determining an active group response rate by dividing the number of user accounts in the active group that respond to the target event after receiving the target information by a total number of user accounts in the active group;

determining a control group response rate by dividing the number of user accounts in the control group that respond to the target event without receiving the target information by the number of user accounts in the control group; and multiplying a difference between the active group response rate and the control group response rate by the total number of user accounts in the active group as a measure of effectiveness of the target information.

8. The server according to claim 7, wherein the user accounts that respond to the target event comprise at least one of the following:

a user account that participates in the target event, a user account that shows the target information, and a user account that shares the target information.

9. The server according to claim 7, wherein the step of splitting according to a preset screening rule, the target user accounts into an active group of user accounts and a control group of user accounts, respectively, by target identifications that are randomly allocated to the target user accounts further comprises: assigning user accounts whose target identifications meet specific characteristic conditions among the target user accounts to the active group and assigning user accounts whose target identifications do not meet the characteristic conditions among the target user accounts as the control group, wherein a plurality of identifications is randomly allocated to each user account.

10. The server according to claim 9, wherein the step of acquiring target information for issuing a target event further comprises: acquiring a plurality of pieces of target information, each piece of target information being used for issuing at least one target event; and the step of assigning user accounts whose target identifications meet specific characteristic conditions among the target user accounts to the active group and assigning user accounts whose target identifications do not meet the characteristic conditions among the target user accounts to the control group comprises:

randomly allocating identification information and a specific condition to each piece of target information, the identification information being corresponding to at least one identification of a user account; and selecting an active group and a control group of each piece of target information from the target user accounts, wherein an identification that is of a user account in the active group of the target information and is corresponding to the target information meets the specific characteristic condition of the target information, and an identification that is of a user account in the control group of the target information and is corresponding to the target information does not meet the specific condition of the target information.

11. The server according to claim 10, wherein the step of pushing the target information to the user accounts in the active group further comprises:

sending the target information of the active group to a plurality of user accounts in the active group and pushing, if there is a user account that pertains to active groups of a plurality of pieces of target information, the plurality of pieces of target information to the user account in turn.

12. The server according to claim 7, wherein the program units further include a plurality of instruction for:

detecting user behaviors of the target user accounts; and
according to the user behaviors, removing a user account that has responded to the target event from the active group.

* * * * *